(12) United States Patent
Stadtfeld

(10) Patent No.: US 9,108,258 B2
(45) Date of Patent: Aug. 18, 2015

(54) METHOD AND TOOL FOR MANUFACTURING FACE GEARS

(75) Inventor: Hermann J. Stadtfeld, Webster, NY (US)

(73) Assignee: THE GLEASON WORKS, Rochester, NY (US)

( * ) Notice: Subject to any disclaimer, the term of this patent is extended or adjusted under 35 U.S.C. 154(b) by 781 days.

(21) Appl. No.: 13/382,171

(22) PCT Filed: Aug. 3, 2010

(86) PCT No.: PCT/US2010/044215
§ 371 (c)(1),
(2), (4) Date: Jan. 4, 2012

(87) PCT Pub. No.: WO2011/017301
PCT Pub. Date: Feb. 10, 2011

(65) Prior Publication Data
US 2012/0099939 A1 Apr. 26, 2012

Related U.S. Application Data

(60) Provisional application No. 61/230,785, filed on Aug. 3, 2009.

(51) Int. Cl.
*B23F 1/06* (2006.01)
*B23F 1/02* (2006.01)
(Continued)

(52) U.S. Cl.
CPC ............... *B23F 15/06* (2013.01); *B23F 21/16* (2013.01); *B23F 23/006* (2013.01); *B23F 5/02* (2013.01); *B23F 5/06* (2013.01); *Y10T 409/103816* (2015.01); *Y10T 409/103975* (2015.01); *Y10T 409/105883* (2015.01)

(58) Field of Classification Search
CPC ............... B23F 1/06; B23F 1/02; B23F 5/06; B23F 5/065; B23F 5/08; B23F 5/085; B23F 5/202
USPC ................. 409/25–27, 30, 38, 50, 51, 56, 57; 451/47, 253
See application file for complete search history.

(56) References Cited

U.S. PATENT DOCUMENTS 1,365,433 A * 1/1921 Wingqvist ...................... 409/39
1,385,097 A * 7/1921 Schmick ......................... 409/10
(Continued)

FOREIGN PATENT DOCUMENTS

CH       250712 A *  9/1947 ................ B23F 5/06
EP       0330289 A1   8/1989
GB       636533 A     5/1950

OTHER PUBLICATIONS

Description (English) CH 250712.*
(Continued)

*Primary Examiner* — Daniel Howell
*Assistant Examiner* — Ryan Rufo
(74) *Attorney, Agent, or Firm* — Robert L. McDowell

(57) ABSTRACT

A cutter disk having cutting blades oriented on its circumference with the cutting edges of the blades oriented perpendicular to the axis of rotation of the cutter disk thereby representing a plane which can be oriented to a work piece (e.g. face gear) under an angle equal to the pressure angle of the mating face gear set's pinion, and, which can be rotated around a virtual pinion axis to generate a tooth flank on the work piece.

11 Claims, 9 Drawing Sheets

Face gear flank generating with tool disk

(51) Int. Cl.
*B23F 5/06* (2006.01)
*B23F 5/08* (2006.01)
*B23F 15/06* (2006.01)
*B23F 21/16* (2006.01)
*B23F 23/00* (2006.01)
B23F 5/02 (2006.01)

(56) References Cited

U.S. PATENT DOCUMENTS

| | | | | |
|---|---|---|---|---|
| 1,403,113 | A * | 1/1922 | Geffroy et al. | 409/25 |
| 1,655,080 | A * | 1/1928 | Wildhaber | 409/26 |
| 1,673,540 | A * | 6/1928 | Wildhaber | 409/26 |
| 1,676,419 | A * | 7/1928 | Wildhaber | 409/26 |
| 1,705,887 | A * | 3/1929 | Wildhaber | 409/26 |
| 1,863,571 | A * | 6/1932 | Lees | 451/47 |
| 1,934,754 | A * | 11/1933 | Wildhaber | 451/47 |
| 2,100,705 | A * | 11/1937 | Wildhaber et al. | 451/47 |
| 2,372,240 | A * | 3/1945 | Wildhaber | 409/26 |
| 3,060,642 | A * | 10/1962 | Cleff | 451/120 |
| 3,099,939 | A * | 8/1963 | Haase et al. | 409/25 |
| 3,137,206 | A * | 6/1964 | Kinichi | 409/30 |
| 4,339,895 | A * | 7/1982 | Fivian | 451/47 |
| 4,565,474 | A | 1/1986 | Charles | |
| 4,954,028 | A * | 9/1990 | Seroo et al. | 409/26 |
| 5,175,962 | A * | 1/1993 | Pedersen | 451/5 |
| 5,562,372 | A * | 10/1996 | Baima et al. | 409/51 |
| 5,791,840 | A * | 8/1998 | Sijtstra | 409/12 |
| 2002/0119737 | A1* | 8/2002 | Tan | 451/47 |
| 2008/0085166 | A1* | 4/2008 | Stadtfeld et al. | 409/2 |
| 2010/0041319 | A1* | 2/2010 | Pilkington | 451/47 |
| 2011/0103911 | A1* | 5/2011 | Stadtfeld | 409/26 |

OTHER PUBLICATIONS

International Search Report and Written Opinion for corresponding PCT/US2010/044215.

* cited by examiner

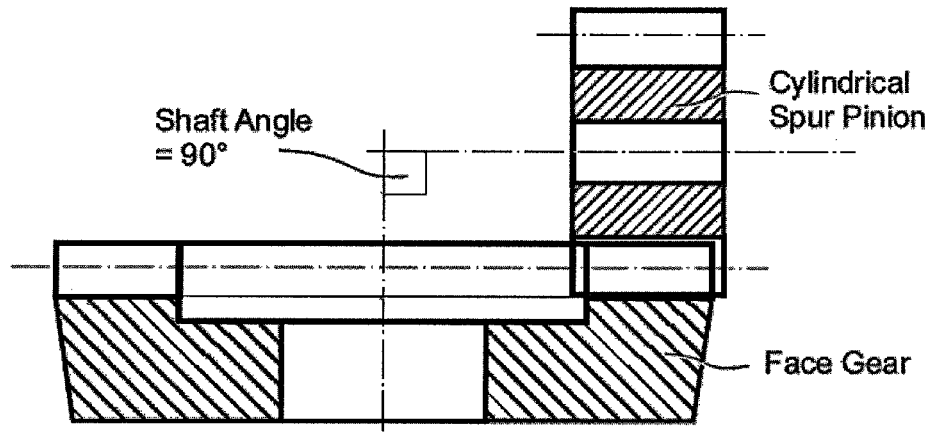
FIGURE 1   Cross section of face gear set
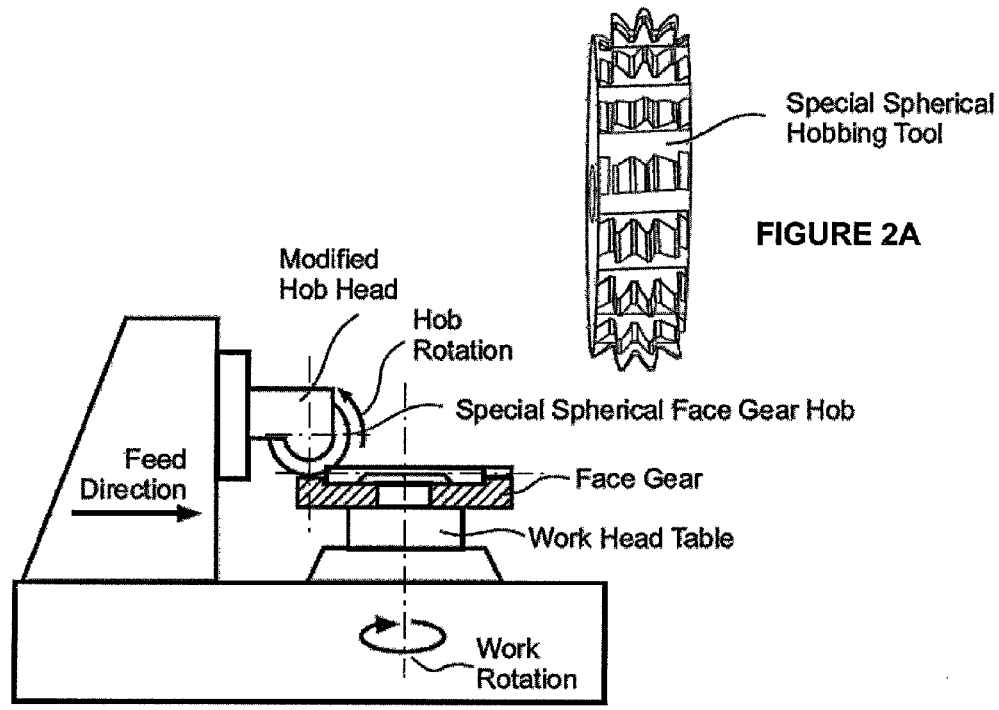
FIGURE 2A
FIGURE 2B   Face gear hobbing

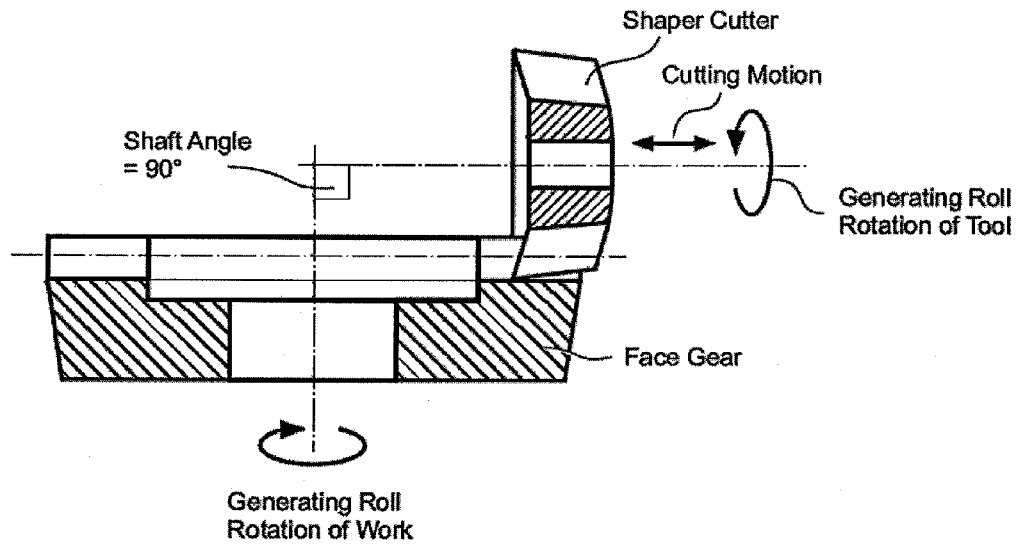
FIGURE 3 Face gear shaping
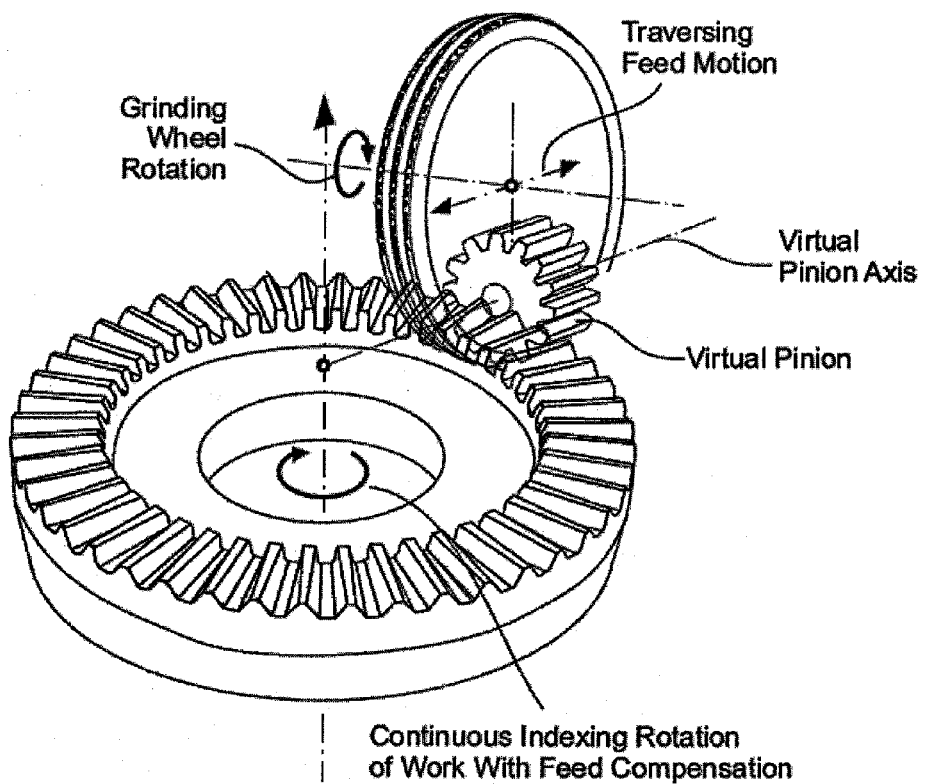
FIGURE 4 Threaded wheel grinding of a face gear

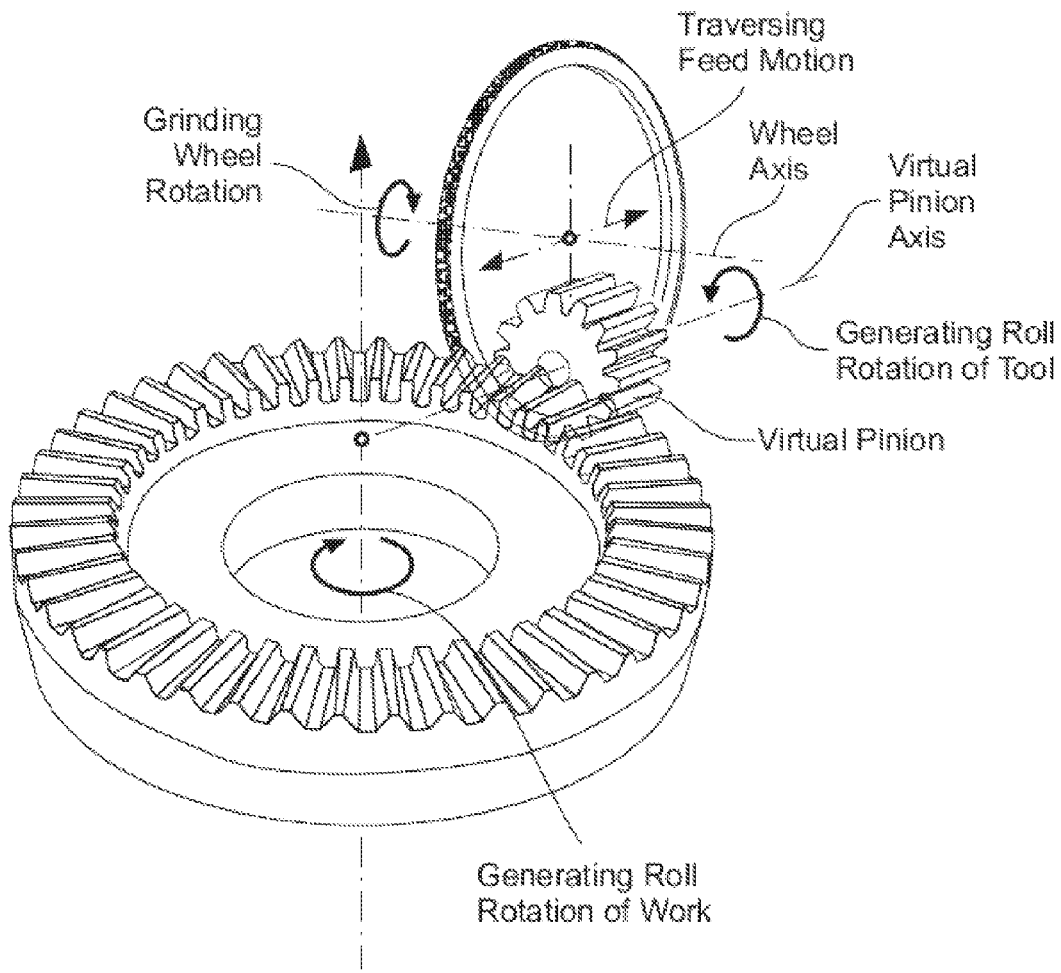
FIGURE 5  Single index generating grinding
(Prior Art)

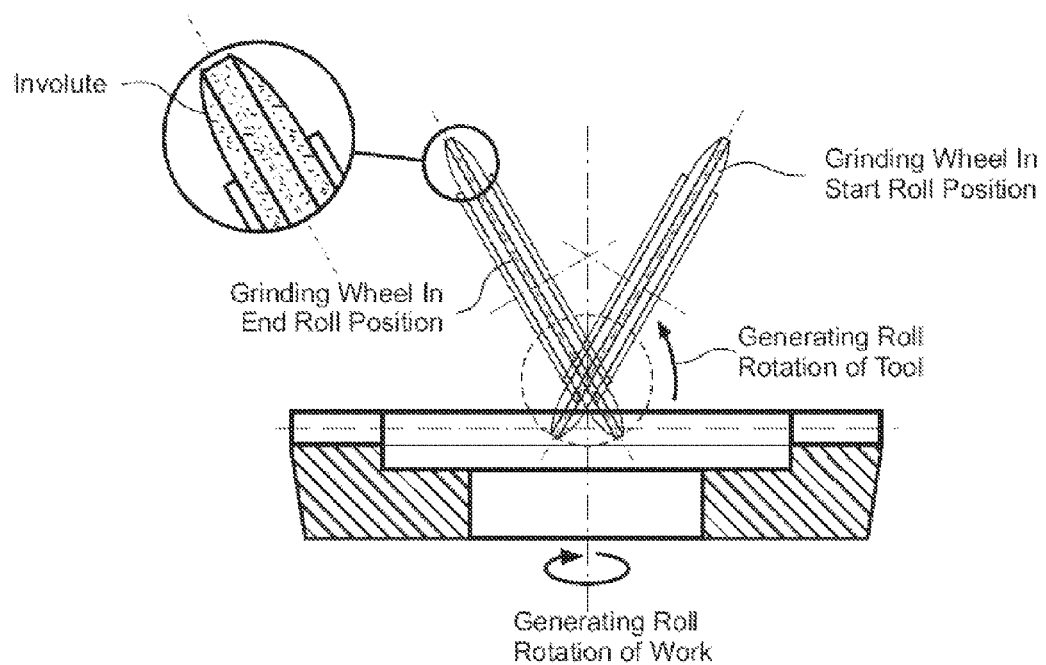
FIGURE 6  Single index generating grinding
(Prior Art)

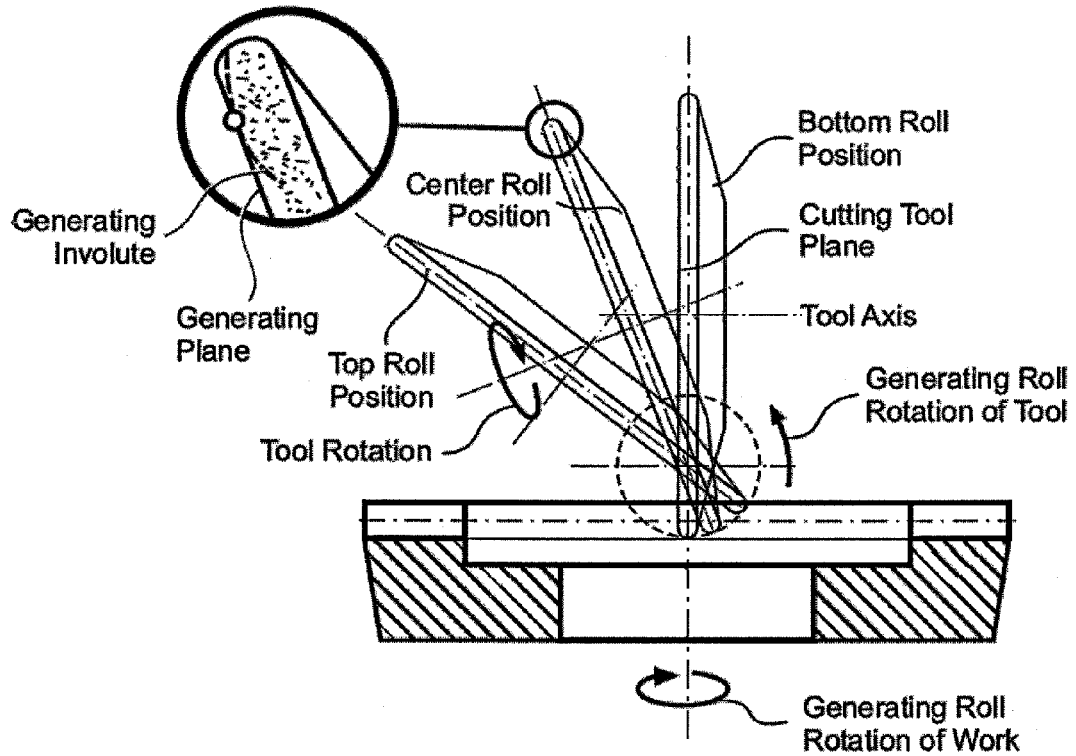
FIGURE 7   Face gear flank generating with tool disk
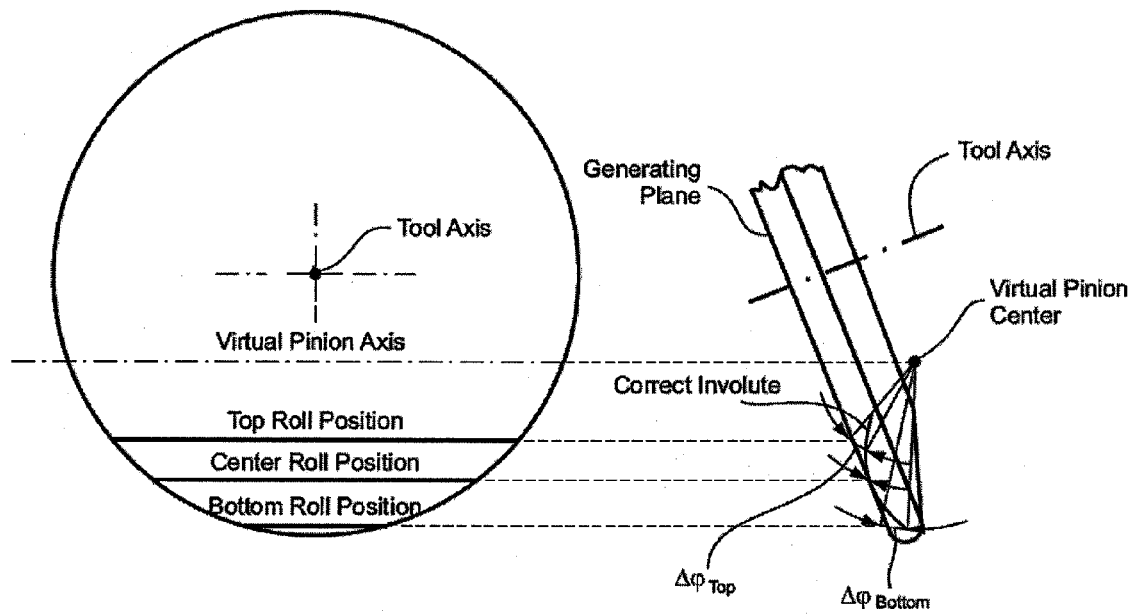
FIGURE 8   Determination of correction amount

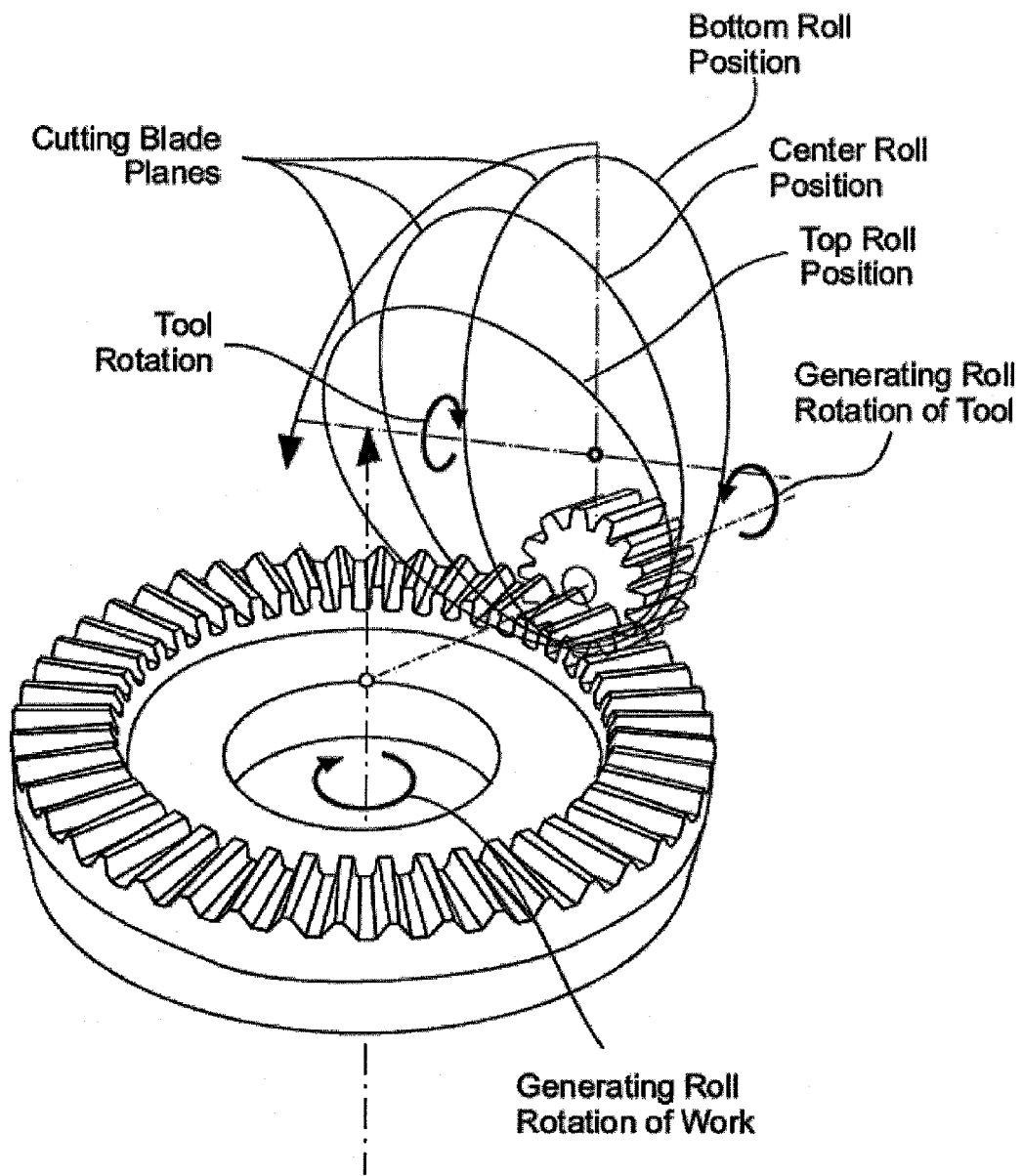
FIGURE 9     Termination of correction amount

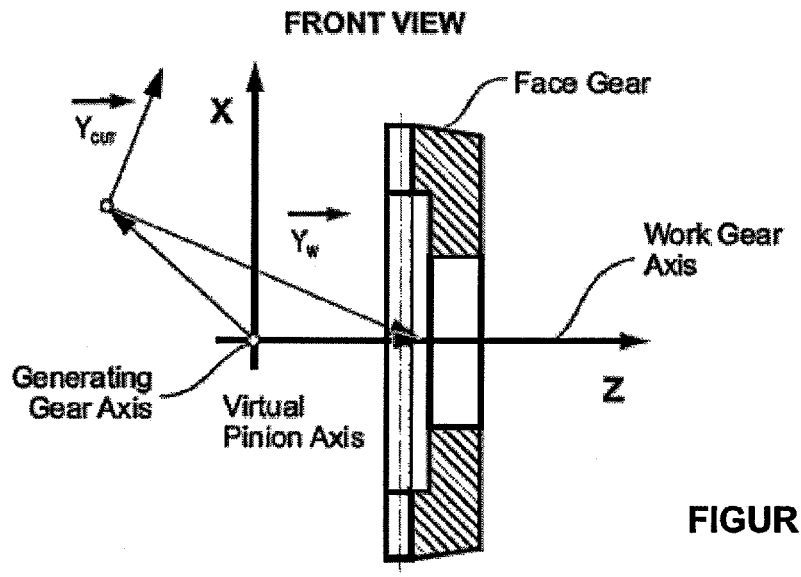
FIGURE 10A
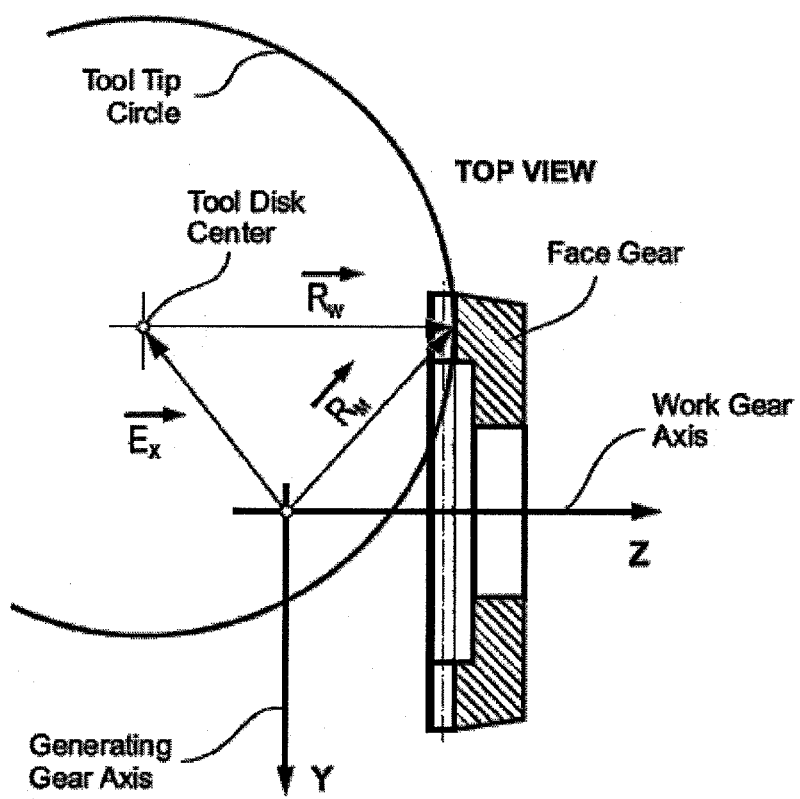
FIGURE 10B    Basic machine configuration

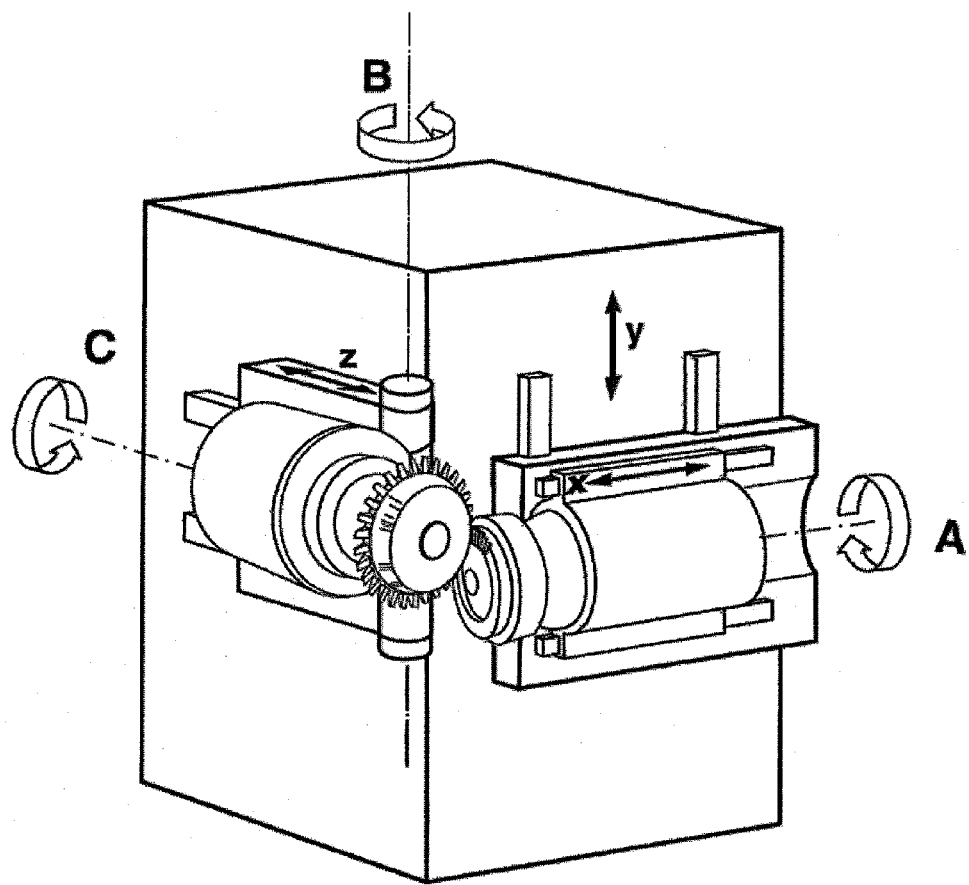
FIGURE 11  Free form cutting or grinding machine

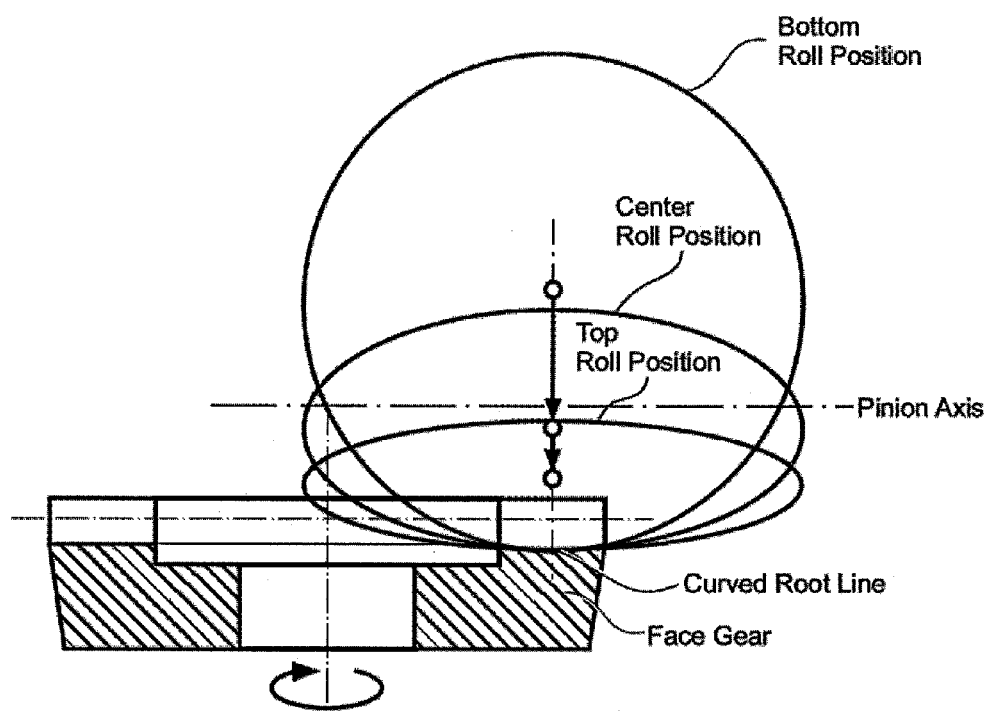
FIGURE 12   Generating of curved root line

METHOD AND TOOL FOR MANUFACTURING FACE GEARS

This application claims the benefit of U.S. Provisional Patent Application No. 61/230,785 filed Aug. 3, 2009 the entire disclosure of which is hereby incorporated by reference.

FIELD OF THE INVENTION

The present invention is directed to the manufacturing of gears and in particular, to a method and tool for manufacturing face gears.

BACKGROUND OF THE INVENTION

Face gears are ring gears with a face angle (and root angle) equal to the shaft angle between the face gear and it's mating member. The mating member is a regular cylindrical spur or helical pinion. Standard face gears have a face angle of 90° which corresponds to a shaft angle of also 90° (such 90° gears are also known as "crown" gears).

To date, methods of manufacturing face gears have been complicated, with special tools dedicated to a single design applied on machine tools which are usually modified cylindrical gear manufacturing machines. Such methods for the soft manufacturing of face gears include:

Hobbing, using a job dedicated special hob on a cylindrical hobbing machine, which is modified in order to allow for cutting at the lowest circumferential section of the hobbing tool (vertical hobbing machine table axis).

Shaping, using a shaper cutter representing the mating cylindrical pinion, and a shaping machine, with a work table which is rotated (versus a regular cylindrical gear shaping machine) by the face gear set's root angle (commonly 90°).

Universal milling method, using an end mill on a 5-axes machining center.

Grinding from solid, using the grinding methods mentioned in the hard finishing section below.

Today's known methods for the hard finishing of face gears include:

Continuous grinding, using a threaded grinding wheel with a thread reference profile, identical to the face gear set's pinion tooth profile on a large diameter wheel with small width having generally 1.5 to 2.5 thread revolutions (see WO 98/02268; U.S. Pat. No. 6,390,894; and U.S. Pat. No. 6,951,501 the disclosures of which are hereby incorporated by reference).

Single index generating grinding with a wheel profile identical to the face gear set's pinion tooth profile.

Skiving, using a shaper cutter or special hob.

Skiving, using and end mill on a 5-axes machining center.

Honing, using a modified pinion with an abrasive layer on the tooth surface.

Presently, face gear soft machining methods depend on job specific, special tools, which are expensive and not flexible regarding their use for other jobs or for optimizations. The machining time of a face gear is in general significantly longer than the cutting time of a comparable cylindrical or bevel ring gear.

Two of the more common face gear hard finishing methods use either a very complex tool geometry which is difficult to dress and requires a long dressing time (threaded wheel grinding), or a complicated and time consuming generating roll, combined with a feed motion in face width direction (single index generating grinding).

Skiving with a special hob or a shaper cutter made from carbide material provides reasonable cutting times but requires a tool which is not only expensive but also not readily available or not available at all.

Face gear honing requires, for example, a heat treated, ground and CBN coated pinion, which is expensive, not flexible and depends on a rather large pinion offset (equal the required offset between face gear and mating cylindrical pinion) for good chip removal, which limits the application to face gear sets which have such a high offset.

SUMMARY OF THE INVENTION

The present invention is directed to a cutter disk having cutting blades oriented on its circumference with the cutting edges of the blades oriented perpendicular to the axis of rotation of the cutter disk thereby representing a plane which can be oriented to a work piece (e.g. face gear) under an angle equal to the pressure angle of the mating face gear set's pinion, and, which can be rotated around a virtual pinion axis to generate a tooth flank on the work piece.

BRIEF DESCRIPTION OF THE DRAWINGS

FIG. 1 shows a 2-dimensional, cross sectional view of a face gear and its mating cylindrical spur pinion.

FIGS. 2A and 2B show, respectively, a spherical hobbing tool and a cylindrical hobbing machine.

FIG. 3 shows a face gear, where the pinion in FIG. 1 is replaced with a shaper cutter.

FIG. 4 shows a 3-dimensional view of a threaded grinding wheel which is dressed such that it duplicates in an axial plane cross section the profile of the hobbing tool of FIG. 2A.

FIG. 5 shows a peripheral disk grinding wheel with a grinding profile that duplicates the face gear mating pinion tooth profile.

FIG. 6 shows a 2-dimensional cross sectional view of a face gear and grinding wheel (face gear axis lies in cross section plane, cross section plane is perpendicular to virtual pinion axis). FIG. 6 also contains an exploded view of the periphery of the grinding wheel.

FIG. 7 shows the grinding (or cutting) disk in the bottom (start), center and top (end) roll position.

FIG. 8 shows a 2-dimensional graphic (left) and a view at the tool disk (right), which also shows the position of the virtual pinion axis and three contact lines representing the bottom, center and top roll positions.

FIG. 9 shows a 3-dimensional view of the face gear and the tool disk. The tool disk is represented with an outline in the bottom, center and top roll positions.

FIGS. 10A and 10B show, respectively, front and top views of the triangular vector diagram which correlate with its coordinate system and vectors directly to a cradle style bevel gear generator.

FIG. 11 shows the arrangement between cutter disk and face gear in a 6-axis free form machine.

FIG. 12 shows how the deepest root line of the face gear is formed by the periphery of the tool disk.

DETAILED DESCRIPTION OF THE PREFERRED EMBODIMENT

Before any features and at least one construction of the invention are explained in detail, it is to be understood that the invention is not limited in its application to the details of construction and the arrangements of the components set forth in the following description or illustrated in the drawings. The invention is capable of other constructions and of being practiced or being carried out in various ways. Also, it is understood that the phraseology and terminology used herein is for the purposes of description and should not be regarded as limiting.

The use of "including", "having" and "comprising" and variations thereof herein is meant to encompass the items listed thereafter and equivalents thereof as well as additional items. The use of letters to identify elements of a method or process is simply for identification and is not meant to indicate that the elements should be performed in a particular order.

Although references may be made below to directions such as upper, lower, upward, downward, rearward, bottom, top, front, rear, etc., in describing the drawings, the references are made relative to the drawings (as normally viewed) for convenience.

These directions are not intended to be taken literally or limit the present invention in any orientation or form. In addition, terms such as "first", "second", "third", etc., are used to herein for purposes of description and are not intended to indicate or imply importance or significance.

The utilization of face gears for certain applications is highly dependent on the availability of an efficient and economical manufacturing process. To date, no economical soft machining or hard finishing process for face gears is available.

FIG. 1 shows a 2-dimensional, cross sectional view of a face gear and its mating cylindrical spur pinion. The shaft angle between face gear axis and pinion axis is 90° in this example. Shaft angles larger than 90° will make the face gear an internal ring gear. In the special case of a 0° shaft angle, the face gear pair mutates to a cylindrical ring gear.

FIG. 2A shows a spherical hobbing tool. The cutting blades (cutting teeth) of the hob represent the teeth of a spur pinion, as they are grouped around the cylindrical pinion body (in a section consisting of 3 teeth). FIG. 2B also shows a cylindrical hobbing machine with a modified hob head, which allows to cut the teeth of a face gear on the bottom section of the hob. Commonly a single start hob is used which will require a work rotation of one pitch for every revolution of the hob. The hob is fed from the outside of the face gear to the inside. During the tool feeding, a compensation amount of the work rotation, depending on the tool lead angle has to be considered.

FIG. 3 shows a face gear where the pinion in FIG. 1 is replaced by a shaper cutter. The shaper cutter has a number of cutting teeth, equal to the mating pinion (also equal virtual pinion) of the face gear. The cutting contour in a plane, perpendicular to the shaper cutter axis duplicates exactly the virtual pinion's face contour. While the shaper cutter rotates in mesh with the face gear, a stroke motion in axial cutter direction is required for the chip removing action.

FIG. 4 shows a 3-dimensional view of a threaded grinding wheel which is dressed such that it duplicates in an axial plane cross section the profile of the hobbing tool of FIG. 1. While the threaded wheel rotates, the curved orientation of the grinding thread profiles approximate the rotating virtual pinion profile at the location of the plane, defined by the grinding wheel axis and the stroke direction. In order to simulate the entire width of the virtual pinion, the grinding wheel has to traverse in the virtual pinion axis direction along the face width of the face gear. In case of a single thread grinding wheel, the work has to rotate one pitch for every wheel rotation. During the traversing process, the work rotation is superimposed by a lead compensation value.

FIG. 5 shows a peripheral disk grinding wheel. The grinding profile duplicates the face gear mating pinion tooth profile. This profile forms one point of the face gear profile on each side of the grinding wheel (one roll position and one face width position). If the wheel strokes in direction of the virtual pinion, one contact line (on each side of the generated profile) between virtual pinion and face gear is formed. In order to form the entire face gear tooth profile, the grinding wheel has to rotate around the virtual pinion axis (while it strokes). If the stroke motion was infinitely fast and if the rotation around the virtual pinion axis was infinitely slow, then a mathematically perfect pair of face gear flanks would be generated. The grinding wheel position in FIG. 5 represents a center roll position in the generating roll process.

FIG. 6 shows a 2-dimensional cross sectional view of the face gear (face gear axis lies in cross section plane and the cross section plane is perpendicular to virtual pinion axis). The view is also directed at the periphery of the grinding wheel, which is shown not in the center roll position as in FIG. 5 but in the start and end roll position.

As discussed above, the identified prior art soft and hard machining methods for face gears depend on job specific, complex and special tools which are expensive and inflexible regarding their use for other jobs or for optimizations. Additionally, processing and/or dressing times are long and complicated.

The inventor has discovered that a tool disk (e.g. cutting or grinding) having cutting blades (or abrasive material) oriented on its circumference with the cutting edges of the blades oriented perpendicular to the axis of rotation of the cutter disk, represents a plane which can be oriented to a work piece (face gear) under an angle equal to the pressure angle of the mating face gear set's pinion and which can be rotated around a virtual pinion axis, while it generates one face gear flank on the work piece. FIG. 7 shows the grinding (or cutting) disk in the bottom (start), center and top (end) roll position. The disk has an abrasive layer (or cutting edges) on the left face, which is perpendicular to the axis of rotation (or slightly tapered) and on the outside. The face of the disk is a generating plane which in the center roll position perfectly represents the pitch line of the virtual pinion. In every roll position between start and end roll, the tool and the work piece have to be rotated about a certain angles. The tool disk has to be rotated into every new roll position around the virtual pinion axis by an angle, calculated from the number of face gear teeth divided by the number of virtual pinion teeth, multiplied by the incremental work gear rotation angle, plus a small additional amount of rotation, which places the disk such that it has a common line with the involute in this particular roll position.

FIG. 9 shows a 3-dimensional view of the face gear and the tool disk. The tool disk is only represented with an outline in the bottom, center and top roll position. The discussed generating plane is the surface inside of the tool disk outline. In case of the inventive process, there is no traversing feed motion, which will significantly reduce the machining time compared to processes which require the traversing feed motion.

The virtual pinion axis can be located in a virtual or theoretical bevel gear generating basic machine, such as is described in U.S. Pat. Nos. 4,981,402 or 6,712,566, the disclosures of which are hereby incorporated by reference, in order to represent a generating cylindrical pinion (generating pinion) where the generating pinion and the work gear resemble the same relationship as the face gear and its mating cylindrical pinion in their final application (for example, a gear box). While the cutter rotates around the virtual pinion axis, the work has to rotate around its axis according to the ratio between pinion and face gear.

Since the cutter blades represent one flank of a straight sided rack, as mentioned above, it is not yet duplicating a correct generating involute of the pinion flank (FIG. 7, generating involute versus generating plane). This can be achieved by shaping the cutting edge of the blade identical to the involute of the original pinion flank which should mate with the face gear flank to be manufactured. Another possibility which allows the use of the simplistic and universal straight edged cutting tools is the introduction of a non-constant generating roll relationship (for example, Modified Roll) while generating one flank or utilizing one or more active machine settings such as described in U.S. Pat. No. 5,580,298, the disclosure of which is hereby incorporated by reference. Roll angle related coefficients of 4 orders or higher are multiplied with the constant basic ratio of roll between generating pinion and work gear (face gear) which will accomplish a good approximation of the involute of a virtual generating pinion.

$$Ra = Ra_0 + Ra_1 \cdot q + Ra_2 \cdot q^2 + Ra_3 \cdot q^3 + Ra_4 \cdot q^4 \quad (1)$$

Where:
Ra . . . ratio of roll (not constant)
q . . . roll angle distance from center of roll
$Ra_0$ . . . basic ratio of roll (constant)
$Ra_1$ . . . first order coefficient, multiplied with roll angle distance from center of roll
$Ra_2$ . . . second order coefficient, multiplied with square of roll angle distance from center of roll
$Ra_3$ . . . third order coefficient, multiplied with third power of roll angle distance from center of roll
$Ra_4$ . . . fourth order coefficient, multiplied with fourth power of roll angle distance from center of roll The involute curvature radius can be calculated in a number of points along the generating pinion profile. The second order coefficient $Ra_2$ will basically define the curvature of the involute at the pitch point. The third order coefficient $Ra_3$ will take a constant change of curvature, between root and top into account. The largest part of the non-constant involute curvature change can be accomplished by defining the fourth order coefficient $Ra_4$. A preferred method of calculating optimal coefficient is to use a regression calculation, which, for example, applies the "least squared error method" to minimize the differences between the correct involute and the affect of the coefficients to roll motions, in order to simulate the involute shape by non-linear roll ratio. Higher orders than 4 can be applied to improve the involute accuracy, or the mathematical function of the involute can be applied directly in the machine kinematics. An example of a computation of the correction amount between straight line and involute is shown in FIG. 8.

FIG. 8 shows to the left in a 2-dimensional graphic, a view at the tool disk, which also shows the position of the virtual pinion axis and three contact lines, representing the bottom, center and top roll position. On the right side the view onto the periphery of the tool disk is shown in the center roll position. The contact lines are shown in this view as points. The correct involute of the virtual pinion is drawn inside of the disk where the involute contacts the generating plane in the contact point (contact line) of the center roll position). The involute function can be calculated with the virtual pinion information such as pressure angle and pitch diameter. The points on the disk's generating surface can be connected with the involute with circles which have their origin in the point which represents the location of the virtual pinion axis. Only at the pitch point (center roll position) will the arc length be zero. The arc in every other position represents the precise value of the small additional amount of rotation (angle Δφ), either to be used to define modified roll coefficients (Equation 1) or to be superimposed on the tool disk rotation around the virtual pinion axis during the generating roll. It is also possible to give the outside profile exactly the shape of the involute instead of a straight line, perpendicular to the tool axis. In this case, no corrective rotation has to be applied.

In the case where wheel diameters are small relative to the face width, a slightly distorted generating profile may result. In other words, only at the center of the face width will the involute on the tool be perpendicular to the theoretical root line. However, if the face width is smaller than $2 \cdot \sin 5° \cdot$ (Diameter/2), then the profile miss-location in profile direction amounts to $(1-\cos 5°) \cdot$Diameter/2, which is 0.38% of the tool disk radius, which can be neglected in most cases. The Δφ angles (for any desired number of profile points) can be used as the heretofore mentioned small additional amount of rotation of the virtual pinion (in the case of a plane too disk).

While the described procedure will only generate one flank of one slot, it has to be repeated for every slot of the face gear according to the face gear's tooth count (single indexing process). In order to achieve this, the tool is withdrawn from the face gear slot to an indexing position, then the indexing rotation of the work gear (face gear) occurs.

$$\text{Indexing angle} = 360°/(\text{number of face gear teeth}) \quad (2)$$

After indexing, the tool is fed to full slot depth in the work piece by a suitable tool feeding method, such as by vector feeding, for example, as shown in U.S. Pat. Nos. 5,310,295 or 5,716,174 the disclosures of which are hereby incorporated by reference. The angular orientation of the tool feed process portion (plunging) is preferably chosen to be the root roll position. After the tool tip reaches the slot bottom, the generating roll begins, which forms the face gear tooth flank profile, beginning at the root and ending at the top of the face gear tooth (FIG. 7).

Alternatively, the tool may be positioned in the top roll position after indexing and the face gear flank profile may be generated from the top down to the root without any plunging.

After the first flank of every slot is generated, the tool can be repositioned in the virtual bevel gear generating basic machine, such that it represents the second flank of the generating pinion. In order to generate the second flank of every face gear tooth, the same procedure used to generate the first flank can be applied. For the cutting process of the second flanks, the slots already exist from the first flank generating thereby allowing the application of finishing parameters regarding surface speed and roll motion. In contrast to this, the first slot cutting is effectively a roughing-finishing combination.

If the generating occurs from root to top, then the feed motion in order to move the tool from the indexing position to the bottom roll position can occur fast (rapid feed) along a substantial amount of the distance (90% for example) and slow down at the end of the feed, when only a small amount of material is removed before the generating roll begins.

The inventive set up and kinematic relationships can be based on a virtual bevel gear generating basic machine as described above or on other models or procedures, which are applicable as well. FIGS. 10A and 10B show the triangular vector diagram, which correlates with its coordinate system and vectors directly to a cradle style bevel gear generator. FIG. 10B represents the front view, perpendicular to the cradle axis (equal to the virtual pinion axis). $R_M$ points from the cradle axis to the root of the generated face gear slot. $E_X$ points from the cradle axis to the tool disk origin (tool axis reference point). $Y_{cut}$ is the tool disk axis vector. $R_W$ points from the tool disk center to the root of the generated face gear slot. The center of roll position is shown where $Y_{cut}$ has an angle of equal to the virtual pinion's pressure angle but lies in the plane X-Z with no other inclinations. FIG. 10A shows the top view of the triangular vector diagram. This view verifies the vector arrangement from the top view and delivers, together with the front view, a single valued definition of the vector diagram.

From the virtual basic machine it is possible to transform the face gear cutting process into suitable mechanical machines settings. It is also possible as a preferred embodiment of the inventive process to transform the virtual basic machine (or any other model) into a table of axis positions and/or motions of a free form 5 or 6-axes machine such as shown in FIG. 11 (for example, U.S. Pat. Nos. 4,981,402 or 6,712,566). FIG. 11 shows the arrangement between cutter disk and face gear in a 6-axis free form machine. The vector diagrams in FIGS. 10A and 10B, plus the generating roll ratio represent all information in order to calculate an axes position table. The artisan will understand that small additional amounts of rotation $\Delta\phi$ have to be superimposed to the tool rotation in order to produce correct flank forms.

The transformation of virtual basic settings into the positions (and/or motions) of a rectilinear free form machine will translate the first and second flank cutting into an upper and lower cutting position within the free form machine. In case of a true face gear, with a face and pitch angle of 90° the work is required to rotate 180° after first flanks (e.g. upper flanks) are generated in order to generate the second flank (e.g. lower flanks) of the same slots with the correct slot width.

In face gears with face and pitch angles not equal 90° (in case of shaft angles between cylindrical pinion and face gear of unequal 90°) a calculation such as shown in U.S. Pat. No. 7,364,391, hereby incorporated by reference, may be applied in order to find the work phase angle rotation required to generate the correct slot width.

In the inventive process, consideration should be given to the tool curvature, defined by the circumferential tool (e.g. cutter) radius, which will generate a root line which is not straight but curved. The slot depth at the ends of the face gear teeth is correct (derived from the face gear mating cylindrical pinion plus clearance) but has excess depth between toe and heel and is commonly the deepest at mid face. FIG. 12 shows how the deepest root line of the face gear is formed by the periphery of the tool disk. The resulting root line will be the enveloping surface from the spectrum of roll positions. The inner and the outer end of the face gear have the theoretical depth (of the theoretically parallel deep tooth as shown on the left side of the face gear). Between the two ends an excess depth is generated, which generally is the deepest at midface. The curvature of the root line may be controlled with the diameter of the cutter disk, however, the curved root line has not shown disadvantages in straight bevel gears manufactured in accordance with U.S. Pat. No. 7,364,391 mentioned above. Thus, it is a preferred embodiment to use the largest possible cutter disk for a given design.

Another aspect of the inventive method is that the cutter disk only forms a rotational symmetric surface on its axial face. This allows the approximation of involutes of spur pinion flanks. The flanks of helical gears wind around the pinion base cylinder like a spiral. The spiral shape cannot be approximated using a rotating cutting disk, which limits the inventive method to face gears that use a spur pinion as a mating member. Helical gears with a very small helix angle (e.g. below 5°) will only show minor flank and root deviations, which can be at least partially corrected.

Shaft angles between face gear and mating pinion between 0° (face gear mutates into a cylindrical gear) and above 90° (face gear becomes an internal ring gear) are possible with the inventive method. Also shaft offset between face gear and mating pinion can be realized with the inventive method.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A method of manufacturing a face gear, said face gear having a plurality of tooth slots with each tooth slot comprising first and second tooth surfaces, said method comprising:
providing a face gear workpiece having an axis of rotation;
providing a disk-shaped tool having a circumference and an axis of rotation, said tool having one or more stock removing surfaces positioned on the circumference with the stock-removing surfaces being oriented generally perpendicular to said axis of rotation and defining a generating plane;
positioning said tool and said workpiece relative to one another for generating one of said first or second tooth surfaces on said workpiece;
rotating said tool about said axis of rotation and feeding said tool relatively into said face gear workpiece;
generating one of said first or second tooth surfaces on said workpiece by moving the tool and workpiece relative to each other;
wherein said generating comprises rotating said work piece about its axis of rotation and rotating said tool about an axis of rotation of a virtual pinion in mesh with said face gear workpiece, said tool and generating plane describing a generating roll which emulates the rolling motion of a tooth of said virtual pinion rotating in mesh with said face gear workpiece during said generating,
wherein said method comprises no traversing feed motion.

2. The method of claim 1 further comprising repositioning said tool and said workpiece relative to one another and generating the other of said first or second tooth surfaces on said workpiece, said generating comprises rotating said work piece about its axis of rotation and rotating said tool about an axis of rotation of a virtual pinion in mesh with said face gear workpiece, said tool and generating plane describing a generating roll which emulates the rolling motion of a tooth of said virtual pinion rotating in mesh with said face gear workpiece during said generating.

3. The method of claim 1 wherein said rotation of the tool about the pinion axis of rotation and said rotation of said face gear workpiece are carried out in a timed relationship with one another.

4. The method of claim 3 wherein said timed relationship is in accordance with the number to teeth of the face gear and the number of teeth of the virtual pinion.

5. The method of claim 1 wherein said generating roll comprises a predetermined number of generating roll increments and wherein said face gear workpiece is rotated by an additional predetermined amount during each of said increments so as to position the tool to have a common line with the tooth surface being formed at the particular generating roll increment.

6. The method of claim 1 wherein said one or more stock removing surfaces of said tool are straight.

7. The method of claim 1 wherein said one or more stock removing surfaces of said tool are of a shape matching the tooth flank shape of the virtual pinion.

8. The method of claim 1 wherein the virtual pinion comprises tooth flank surfaces in the form of an involute.

9. The method of claim 1 wherein subsequent to generating a tooth flank surface, the tool is withdrawn from a tooth slot and the face gear workpiece is indexed to another slot position and the generating method is repeated for that tooth slot position, the steps of withdrawing, indexing and generating being repeated for all tooth slots on said face gear workpiece.

10. The method of claim 1 wherein said feeding comprises plunging said tool to a tooth bottom position in said face gear work piece followed by generating a tooth surface by said generating roll along a generating path beginning at the bottom position of said tooth and commencing in direction toward a top portion of said tooth.

11. The method of claim 1 wherein said feeding comprises contacting said tooth at a top portion thereof followed by generating a tooth surface by said generating roll along a generating path beginning at the top portion of said tooth and commencing in direction toward a tooth bottom position of said tooth.

\* \* \* \* \*